United States Patent Office 2,929,805
Patented Mar. 22, 1960

---

2,929,805

NEOPRENE CEMENT

William E. Tann, Akron, Ohio, assignor to The Firestone Tire & Rubber Company, Akron, Ohio, a corporation of Ohio No Drawing. Application January 9, 1957
Serial No. 633,190

18 Claims. (Cl. 260—79.5)

This invention relates to improved neoprene (rubbery chloroprene polymer) cements and more particularly to vulcanizable neoprene cements containing a combination of stabilizing agents and vulcanization accelerators as specified herein.

Neoprene air-curing cements until the present invention, underwent great increase in viscosity to attain a gelled state during storage before use. This gelled state was due to cross linking produced by curing agents, polymerization oxidation or by mechanism not completely understood. In any event such a gelled state renders the neoprene cement entirely useless for bonding surfaces. Gelling of neoprene cement during storage has been avoided before the present invention by manufacturing the cement in two parts and storing each part separately. A non-vulcanizing solvent base cement portion was formed of neoprene and modifying ingredients such as zinc oxide and carbon black dispersed in a solvent but without a vulcanization accelerator. The base cement portion and the accelerator portion were stored separately until ultimate use. Whereupon the base cement and the accelerator portion were mixed and the resulting vulcanizable cement was applied immediately to surfaces to be bonded. Such two-part cement is cumbersome to store, ship and use. Moreover such cement is unsatisfactory particularly because in the event that all of the vulcanizable adhesive is not used immediately after the accelerator is added the portion not so used will gel and thus become unusable. The term "cements" as used in this specification includes coatings, paints and adhesives wherein a chloroprene polymer is dissolved or dispersed in a non-aqueous solvent.

A proposal has been made to reduce the gelling tendency of neoprene cements by reducing the amount of vulcanization accelerator used therein. In order to form a satisfactory bond between two cemented surfaces, it is necessary to vulcanize the cement. However, the use of a less quantity of accelerator requires that the step of vulcanizing the cement be increased an undesirable length of time. Moreover a reduction of the amount of accelerator in a cement reduces the strength of the vulcanized bond formed by such cement.

The most successful of the prior art neoprene cements to resist gelling is compounded with a vulcanization accelerator combination of dibenzylamine and carbon disulfide. This cement, although having some resistance to gelling for short periods of time, has a very slow rate of vulcanization and for that reason is unsuitable for most applications, particularly those requiring an air-curing cement.

An object of the present invention is to provide a neoprene cement which will not gel under normal conditions of storage but which has a rapid rate of vulcanization.

Another object of the invention is to provide an air-curing neoprene cement which forms a vulcanized bond of great strength between two surfaces than has heretofore been possible by the use of a neoprene cement.

A further object of the invention is to provide a neoprene cement resistant to gelling during storage but capable of producing a strong vulcanized bond between two surfaces in reduced vulcanization time.

The above and other useful objects are attained by incorporating in a solvent neoprene cement a novel combination of accelerators. The accelerators of the novel combination are dibenzylamine, an alkylene polyamine and carbon disulfide. The accelerators of the invention may be added separately to the cement or may be mixed with carbon disulfide and then added directly to the base cement to obtain the desired results.

One of the accelerators of the invention is selected from the alkylene polyamines, including ethylene diamine, a propylene diamine, a butylene diamine, an amylene diamine, a hexylene diamine, diethylene triamine, triethylene tetramine, tetraethylene pentamine, pentaethylene hexamine and homologs of any of the foregoing amines.

The alkylene polyamine and dibenzylamine, the preferred saturated amine, may be mixed before being added to the cement or may be added to the cement singly as desired.

In one manner of preparing a cement of the invention, neoprene is masticated on a two-roll mixing mill and ingredients such as carbon black, antioxidant, sulfur and oils are added with continued mastication until a uniform dispersion of ingredients in the neoprene is obtained. The neoprene compound is removed from the mill and is dissolved by stirring in a suitable solvent, such as toluene, until a cement of a concentration approximating one pound of neoprene compound for each gallon of cement is produced. Other methods of mixing are familiar to those skilled in the art of manufacturing solvent cements and will produce satisfactory results. Therefore, it is not intended to limit the inventions to the method of mixing set forth above.

Among the known solvents useful for neoprene cements are aromatic solvents such as benzene, toluene, xylene and their homologs; ethylene dichloride, trichloroethylene and other chlorinated hydrocarbon solvents; ester solvents, such as amyl acetate, butyl formate, butyl acetate, ethyl acetate and ethyl propionate; ketones, such as methyl ethyl ketone, isophorone and the like; mixtures of any of the above solvents with each other or with gasoline or the like; and commercial mixed solvents for neoprene known to the art.

Cements of the invention were tested according to the following tests:

*Oven tests*

A container holding a sample of the cement to be tested is placed in an atmosphere of hot air at 158° F. or at room temperature (approximately 75° F.) and the time required for the appearance of a solid gel formation in the cement is recorded.

*Dead weight test*

The surfaces of two strips of rubberized fabric 12 x 4¼ inches are cleaned with an aromatic solvent and a margin of at least ¾ of an inch along one long edge of each strip is cemented with the neoprene adhesive to be tested. The adhesive is allowed to dry and a second adhesive coat is applied and also allowed to dry. The two strips of fabric are pressed together to form a ¾ inch overlapping seam which is rolled out with a roller stitcher to produce intimate contact of the cemented surfaces and to expel air bubbles. The seams thus formed are air-cured at a desired temperature for the length of time of the test. Sample specimens two inches in width are cut at right angles to the seam. The test specimen is placed in an atmosphere of hot air at 140° F. and gripped parallel to the seam with self-aligning grips. A load is applied to the grips normal to the seam at a rate of 30 pounds per minute in an attempt to pull the seam apart. Results are reported in pounds of load and in time in minutes and seconds required for separation of the seam. Apparatus for the test is similar to that shown in Figure 4 of United States Air Force-Navy Aeronautical Specification MIL-C-5539 dated January 9, 1950. This specification requires an air-drying adhesive to cure within ten days and to have a minimum strength of dead weight test of 60 pounds when tested at 140° F.

To carry out the invention, a base stock was mixed on a two-roll mill according to the following formula:

| | Parts by weight |
|---|---|
| Polychlorobutadiene rubber [1] | 100.00 |
| Carbon black | 3.00 |
| Antioxidant | 2.00 |
| | 105.00 |

[1] Neoprene CG was used and is preferred but neoprene AC, neoprene GN, neoprene KN, KNR and other types are acceptable.

The mixed stock was dispersed in toluene to make a base cement with a total solids concentration of approximately 10% by weight although in Example 2 a cement with a solids concentration of 15.8% by weight was used. To this base cement various amounts of ingredients were added and dispersed, and the resulting cements were tested in the oven test and dead weight test, all samples being air-cured at room temperature (75° F.) for the indicated length of time.

To test the characteristics of novel cements using the diamine accelerator of the invention, samples were mixed and tested as shown in Example 1:

*Example 1*

| | Sample No. | |
|---|---|---|
| | 1 | 2 |
| Base Cement [1] | Prior Art 1 gal. | 1 gal. |
| Carbon Disulfide | 14.00 | 22.6 |
| Zinc Butyl Xanthate | | 6.0 |
| Dibenzylamine | 6.16 | 6.2 |
| Ethylene Diamine | | 5.3 |
| Dead Wt. Test (Sample cured 20 hrs. at 75° F.): | | |
| Pounds | 20 | 70 |
| Time— | | |
| Min | 0 | 2 |
| Sec | 40 | 20 |
| Gel at 158° F., Days | 6 | 44 |

[1] Total solids content is 10% by weight.

The use of ethylene diamine with dibenzylamine provides a cement superior in gel resistance and rate of cure to the prior art.

The addition of ethylene diamine to a neoprene cement containing prior art accelerators gives a cement with improved properties as shown by the following example:

*Example 2*

| | Sample No. | | | |
|---|---|---|---|---|
| | 3 | 4 | 5 | 6 |
| Base Cement [1] gal | 1 | 1 | 1 | 1 |
| Carbon Disulfide | 15.9 | 15.9 | 15.9 | 15.9 |
| Dibenzylamine | 4.3 | 4.3 | 4.3 | 4.3 |
| Ethylene Diamine | | 3.7 | 3.7 | 3.7 |
| Zinc Butyl Xanthate | 4.2 | 4.2 | | |
| Tetramethylthiuram Monosulfide | | | | 4.20 |
| Dead Wt. Test (Sample cured 22 hrs. at 75° F.): | | | | |
| Pounds | 31 | 72 | 107 | 108 |
| Time— | | | | |
| Min | 1 | 2 | 3 | 3 |
| Sec | 3 | 24 | 34 | 35 |
| Gel at 158° F., Days | 1 | 6 | 5 | 8 |

[1] Total solids content is 15.8% by weight.

The use of ethylene diamine in Samples 4, 5 and 6 increased rate of cure and gel resistance over Sample 3 accelerated with only dibenzylamine. Zinc butyl xanthate may be used as a retarder and the dibenzylamine-ethylenediamine acceleration as is shown by the test results of Sample 4. The use of tetramethylthiuram monosulfide and the novel acceleration in Sample 6 improves gel resistance of a cement accelerated with ethylene diamine.

Only relatively small proportions of alkylene polyamine and carbon disulfide based upon the neoprene content of the cements of the invention are required. The actual amounts of these ingredients utilized are in line with the amounts of vulcanization accelerators normally employed in neoprene cements. The range of alkylene polyamine useful in the invention ranges from 1 to 15 parts by weight of rubbery chloroprene present. The best results are obtained with a concentration of between 2.5 and 7.5 parts by weight with about 5 parts by weight preferred. From 2 to 15 parts of dibenzylamine may be used while from 4 to 8 are preferred. Excess carbon disulfide is unnecessary in the cement when the reaction product of carbon disulfide and the ethylene diamine is used or when the two chemicals are mixed together or with dibenzylamine before addition to the cement. Excess carbon disulfide might be desirable in some modifications in these cements.

Other cements of the invention, in which ethylene diamine was compared with other alkylene polyamines, were tested as before, in accordance with the following example:

*Example 3*

| | Sample No. | | |
|---|---|---|---|
| | 7 | 8 | 9 |
| Base Cement gal | 1 | 1 | 1 |
| Carbon Disulfide gal | 48.3 | 48.3 | 48.3 |
| Zinc Butyl Xanthate gal | 12.0 | 12.0 | 12.0 |
| Dibenzylamine gal | 12.3 | 12.3 | 12.3 |
| Diethylamine gal | 8.6 | 8.6 | 8.6 |
| Ethylene Diamine gal | 12.0 | | |
| Tetraethylene Pentamine gal | | 37.8 | |
| N,N'-Diethylethylene Diamine gal | | | 33.2 |
| Dead Weight Test: | | | |
| Sample cured 18-20 hours @ 75° F.: | | | |
| Pounds | 135+ | 135+ | 66 |
| Time— | | | |
| Minutes | 4+ | 4+ | 2 |
| Seconds | | | 1 |
| Gel at 158° F | 2 | 7 | 10 |

In the dead weight test neither Samples 7 or 8 failed after 4 minutes and a load of 135 pounds, but the fabric began to tear at that point. Thus, it is seen that other alkylene polyamines are operative in the invention.

The term "chloroprene polymer" is used generically herein to include all commercial neoprenes. The term is used to include homopolymers of chloroprene as well as copolymers of chloroprene with sulfur and/or one or more unsaturated comonomers, including polymerizable ethylene compounds, such as styrene, acrylonitrile, vinylpyridine, vinyl chloride, vinylidene chloride, chlorotrifluoroethylene and derivatives of these substances as well as other known monomers of the aliphatic and aromatic series of compounds; a conjugated diene, such as butadiene, isoprene, dichlorobutadiene and other known polymerizable dienes; and also polymerizable unconjugated polyenes, including pentadiene-1,4 and the like.

What is claimed is:

1. A quick-curing cement containing a rubbery chloroprene polymer, a solvent for said polymer, and, as an accelerator, a relatively small proportion of dibenzylamine and a mixture of relatively small amounts of carbon disulfide with an alkylene polyamine.

2. A quick-curing cement according to claim 1 wherein the alkylene polyamine is ethylene diamine.

3. A method of manufacturing a quick-curing rubbery chloroprene polymer cement comprising the steps of dissolving rubbery chloroprene polymer in a solvent, and adding as an accelerator a relatively small proportion of dibenzylamine and a mixture of relatively small amounts of an alkylene polyamine with carbon disulfide.

4. A quick-curing cement containing a rubbery chloroprene polymer, a solvent for said polymer, and as an accelerator a mixture of a relatively small proportion of dibenzylamine and a mixture of relatively small amounts of carbon disulfide and an alkylene polyamine.

5. A quick-curing cement containing a rubbery chloroprene polymer, a solvent for said polymer and as an accelerator a relatively small proportion of carbon disulfide, a relatively small amount of dibenzylamine and from 1 to 15 parts by weight of said polymer of an alkylene polyamine.

6. A quick-curing cement according to claim 5 wherein the amount of dibenzylamine is from 2 to 15 parts by weight of rubbery chloroprene.

7. A quick-curing cement according to claim 5 wherein the amount of dibenzylamine is from 4 to 8 parts by weight of rubbery chloroprene.

8. A quick-curing cement containing a rubbery chloroprene polymer, a solvent for said polymer and as an accelerator a relatively small proportion of carbon disulfide, a relatively small amount of dibenzylamine and from 1 to 15 parts by weight of said polymer of ethylene diamine.

9. A quick-curing cement according to claim 8 wherein the amount of dibenzylamine is from 4 to 8 parts by weight of rubbery chloroprene.

10. A quick-curing cement according to claim 8 wherein the amount of ethylene diamine ranges from 2.5 to 7.5 parts by weight.

11. A quick-curing cement containing a rubbery chloroprene polymer, a solvent for said polymer and as an accelerator a relatively small proportion of carbon disulfide, a relatively small amount of dibenzylamine and from 1 to 15 parts by weight of said polymer of tetraethylene pentamine.

12. A quick-curing cement containing a rubbery chloroprene polymer, a solvent for said polymer and as an accelerator a relatively small proportion of carbon disulfide, a relatively small amount of dibenzylamine and from 1 to 15 parts by weight of said polymer of N,N'-diethylethylene diamine.

13. A quick-curing cement containing a rubbery chloroprene polymer, a solvent for said polymer and as an accelerator a relatively small proportion of carbon disulfide, a relatively small amount of dibenzylamine and from 5 to 8 parts by weight of said polymer of ethylene diamine.

14. A method of manufacturing a quick-curing cement comprising the steps of dissolving a rubbery chloroprene polymer in a solvent and adding a mixture of relatively small amounts of carbon disulfide, dibenzylamine, and an alkylene polyamine.

15. A method of making a cement according to claim 14 wherein the alkylene polyamine is added in 1 to 15 parts by weight of polymer.

16. A method of making a cement according to claim 14 wherein the alkylene polyamine is from 5 to 8 parts by weight of polymer.

17. A method of making a quick-curing rubbery cement according to claim 15 wherein from 2 to 15 parts of dibenzylamine is mixed with from 1 to 15 parts of alkylene polyamine and carbon disulfide.

18. A method of making a quick-curing rubbery cement according to claim 15 wherein from 2 to 15 parts of dibenzylamine is mixed with from 1 to 15 parts of ethylene diamine and carbon disulfide.

References Cited in the file of this patent

UNITED STATES PATENTS

| | | |
|---|---|---|
| 2,163,611 | MacDonald | June 27, 1939 |
| 2,514,192 | Tann | July 4, 1950 |

OTHER REFERENCES

Barron: "Modern Synthetic Rubbers," page 440, Chapman and Hall (1949).